US012569386B2

(12) United States Patent
Zhang et al.

(10) Patent No.: US 12,569,386 B2
(45) Date of Patent: Mar. 10, 2026

(54) MEDICAL TRANSFER BED

(71) Applicant: JTK MEDICAL EQUIPMENT (GUANGZHOU) CO., LTD., Guangzhou (CN)

(72) Inventors: Min Zhang, Guangzhou (CN); Xuehua Wang, Guangzhou (CN)

(73) Assignee: JTK MEDICAL EQUIPMENT (GUANGZHOU) CO., LTD., Guangzhou (CN)

( * ) Notice: Subject to any disclaimer, the term of this patent is extended or adjusted under 35 U.S.C. 154(b) by 236 days.

(21) Appl. No.: 18/558,367

(22) PCT Filed: Sep. 14, 2021

(86) PCT No.: PCT/CN2021/118220
§ 371 (c)(1),
(2) Date: Nov. 1, 2023

(87) PCT Pub. No.: WO2022/262131
PCT Pub. Date: Dec. 22, 2022

(65) Prior Publication Data

US 2024/0216198 A1 Jul. 4, 2024

(30) Foreign Application Priority Data

Jun. 18, 2021 (CN) ........................ 202110679023.X

(51) Int. Cl.
*A61G 7/10* (2006.01)
*A61G 1/02* (2006.01)
*A61G 1/04* (2006.01)

(52) U.S. Cl.
CPC .............. *A61G 7/1032* (2013.01); *A61G 1/02* (2013.01); *A61G 1/04* (2013.01); *A61G 7/1025* (2013.01); *A61G 7/103* (2013.01)

(58) Field of Classification Search
CPC .... A61G 7/1032; A61G 7/1026; A61G 7/103; A61G 7/1046; A61G 7/1057;
(Continued)

(56) References Cited

U.S. PATENT DOCUMENTS 3,988,790 A * 11/1976 Mracek .................... A61G 7/08 5/83.1
4,761,841 A * 8/1988 Larsen ................ A61G 7/1032 D12/132

(Continued)

FOREIGN PATENT DOCUMENTS

| | | | |
|---|---|---|---|
| CN | 1903154 | A | 1/2007 |
| CN | 111991149 | A | 11/2020 |
| CN | 215503943 | U | 1/2022 |

*Primary Examiner* — Justin C Mikowski
*Assistant Examiner* — Morgan J Mcclure

(57) ABSTRACT

A medical transfer bed includes a vehicle body and a movable bed board mechanism (3) mounted on the vehicle body; the movable bed board mechanism (3) includes an upper-layer bed board (32), a driving roller (33), a conveyor cloth belt (35) and a mounting base (34); the upper-layer bed board (32) is detachably connected to the mounting base (34), and the driving roller (33) is rotatably connected to the mounting base (34); the conveyor cloth belt (35) is sleeved outside the driving roller (33) and the upper-layer bed board (32) and thus is tensioned; two ends of the driving roller (33) are detachably connected to a second driving mechanism (5) to be driven; a limiting piece is arranged on the mounting base (34); and when the limiting piece and the driving roller (33) are misaligned, the driving roller (33) can be arranged separately from the mounting base (34).

9 Claims, 5 Drawing Sheets

(58) Field of Classification Search
CPC .. A61G 7/1073; A61G 7/1025; A61G 7/1034; A61G 1/02; A61G 1/04
See application file for complete search history.

(56) References Cited

U.S. PATENT DOCUMENTS

| | | | | |
|---|---|---|---|---|
| 5,185,894 | A * | 2/1993 | Bastert | A61G 7/1019 74/89.22 |
| 6,289,533 | B1 * | 9/2001 | Hodgetts | A61G 7/1032 5/81.1 R |
| 6,591,435 | B1 * | 7/2003 | Hodgetts | A61G 7/1019 5/81.1 HS |
| 2003/0213064 | A1 * | 11/2003 | Johnson | A61G 7/1057 5/81.1 R |
| 2005/0066442 | A1 * | 3/2005 | Kasagami | A61G 7/1032 5/81.1 C |
| 2007/0251004 | A1 * | 11/2007 | Wang | A61G 7/1019 5/81.1 R |
| 2009/0056012 | A1 * | 3/2009 | Brossart | A61G 7/103 5/81.1 HS |
| 2011/0087502 | A1 | 4/2011 | Yelton et al. | |
| 2016/0106608 | A1 * | 4/2016 | Oh | A61G 7/1034 5/81.1 C |
| 2017/0027794 | A1 * | 2/2017 | Andersson | A61G 7/1017 |
| 2017/0027795 | A1 * | 2/2017 | Asil | A61G 7/1019 |
| 2017/0246059 | A1 * | 8/2017 | Chinn | A61G 1/02 |
| 2018/0177654 | A1 * | 6/2018 | Muscarello | A61G 1/04 |
| 2018/0202532 | A1 * | 7/2018 | Sivanandan | F16H 7/18 |
| 2021/0294388 | A1 * | 9/2021 | Chen | G06F 1/1679 |
| 2023/0181395 | A1 | 6/2023 | Fernando et al. | |
| 2023/0217610 | A1 * | 7/2023 | Lee | G06F 1/1652 361/807 |
| 2024/0016683 | A1 * | 1/2024 | Akhavein Ansari, I | A61G 7/1034 |
| 2025/0213409 | A1 * | 7/2025 | Singh | A61G 7/1073 |

* cited by examiner

MEDICAL TRANSFER BED

CROSS-REFERENCE TO RELATED APPLICATIONS

The present application is a U.S. national phase of International patent application No. PCT/CN2021/118220, filed on Sep. 14, 2021, which claims priority to Chinese patent application No. 202110679023.X, filed to the China national intellectual property administration on Jun. 18, 2021 and entitled "MEDICAL TRANSFER BED". The contents of these applications are incorporated herein by reference in their entireties.

TECHNICAL FIELD

The present application relates to a medical auxiliary transportation device, and in particular to a medical transfer bed.

BACKGROUND

A medical transfer bed is a special medical bed for transferring a patient between beds, transferring the patient from an operating table to a ward, or transferring from an ambulance. Use of a transfer vehicle solves the difficulty of transferring the patient from the operating table to the ward after an operation, and reduces the pain and the difficulty brought to the patient if the patient is transferred by a traditional hand lift. Thus, it is an essential medical device for a hospital.

In the related technology of the medical transfer bed, it mainly includes a movable vehicle body and a movable bed board mechanism used for lateral movement to transfer the patient. The movable bed board mechanism mainly includes a bed board that can be driven by a first driving mechanism to move in a transverse direction. In order to conveniently move the patient from an original sickbed to the bed board, the movable bed board mechanism is often provided with a conveyor roller and a conveyor cloth belt sleeved outside the conveyor roller and the bed board in a tensioning manner; and the conveyor cloth belt cyclically rotates around the conveyor roller and the bed board by means of rotation of the conveyor roller. If there is a need for transferring the patient from the original sickbed to the transfer bed, the bed board is driven by the first driving mechanism to move between the patient and the original sickbed in the transverse direction, during which, the conveyor roller drives the conveyor cloth belt to rotate; the patient is driven to the bed board by means of friction between the conveyor cloth belt and the patient's body; and finally, the bed board resets and is transversely moved onto the vehicle body by means of reverse driving of the first driving mechanism, and then the patient has been transferred.

However, since the conveyor cloth belt makes a direct contact with the patient's body, its cloth surface is easily contaminated with blood stains, drugs and other stains. In an existing medical transfer bed, the conveyor cloth belt is inconvenient to disassemble, and the stains on the cloth surface are difficult to clean.

SUMMARY

In view of this, the present disclosure provides a medical transfer bed with the technical solution as follows.

A medical transfer bed includes a vehicle body and a movable bed board mechanism mounted on the vehicle body. The movable bed board mechanism includes an upper-layer bed board, a driving roller, a conveyor cloth belt and a mounting base; the upper-layer bed board is detachably connected to the mounting base, and the driving roller is rotatably connected to the mounting base; the conveyor cloth belt is sleeved outside the driving roller and the upper-layer bed board and is tensioned by the driving roller and the upper-layer bed board; two ends of the driving roller are detachably connected to a second driving mechanism by means of a clutch mechanism and are driven by the second driving mechanism to rotate; a limiting piece used for limiting the driving roller in a radial direction is arranged on the mounting base; and when the limiting piece and the driving roller are misaligned, the driving roller is capable of being arranged separately from the mounting base.

In an embodiment, the movable bed board mechanism may further include a lower-layer bed board; a side of the lower-layer bed board may be connected to the mounting base and support a lower end of the upper-layer bed board; and the upper-layer bed board may be horizontally limited with the lower-layer bed board together by means of a synchronization piece.

In an embodiment, the synchronization piece may be a special-shaped bolt with a T-shaped section; the special-shaped bolt may be connected to the upper-layer bed board; a T-shaped groove may be formed in the mounting base; and the special-shaped bolt may be disposed in the T-shaped groove and horizontally limited by the T-shaped groove.

In an embodiment, an embedding groove may be formed in a bottom of the T-shaped groove; a positioning bump may be arranged on the limiting piece and disposed in the embedding groove; and the special-shaped bolt may be abutted against an upper end of the positioning bump when being disposed in the embedding groove.

In an embodiment, the limiting piece may be a buckling plate; and the buckling plate may be rotatably connected to the mounting base, may cover the driving roller and may be matched with a mounting groove to form a mounting cavity.

In an embodiment, the buckling plate may include a shielding portion and limiting portions that are split from each other; each of the limiting portions may be arranged at each of the two ends of the driving roller; and the shielding portion may be disposed between the two limiting portions.

In an embodiment, the clutch mechanism may include a first clutch shaft connected to an end part of the driving roller, and a second clutch shaft that penetrates through the mounting base in its own axial direction and is slidably connected to the mounting base; a third driving mechanism used for driving the second clutch shaft to slide may be arranged on the vehicle body; the first clutch shaft may be coaxial with the second clutch shaft; connecting bumps may be respectively arranged at an end of the first clutch shaft and an end of the second clutch shaft opposite to the end of the first clutch shaft; and when the first clutch shaft and the second clutch shaft rotate synchronously, the connecting bump of the first clutch shaft may be abutted against a side of the connecting bump of the second clutch shaft, and the second driving mechanism may drive the second clutch shaft to rotate.

In an embodiment, the second driving mechanism may include a rack arranged above the second clutch shaft and extending in a sliding direction of the mounting base, and a gear arranged in a circumferential direction of the second clutch shaft; the rack may be connected to the vehicle body; and when the second clutch shaft slides on the mounting base, the second clutch shaft may always keep engagement with the rack by means of the gear.

In an embodiment, the third driving mechanism may include a flipping plate rotatably connected to the vehicle body, a driving piece driving the flipping plate to rotate, and an elastic piece used for driving the second clutch shaft to move far away from the first clutch shaft; the flipping plate may extend in a sliding direction of the mounting base; an end of the second clutch shaft may be exposed to the mounting base; the elastic piece may be disposed between the second clutch shaft and the mounting base.

In an embodiment, a mounting groove may be formed in the mounting base; the driving roller may be placed in and rotatably connected to the mounting groove; an inner wall of the mounting cavity may be rotatably connected to at least three limiting roller groups; the limiting roller groups may be arranged in a circumferential direction of the driving roller, and each of the limiting roller groups may include a plurality of limiting rollers arranged in an axial direction of the driving roller; and the limiting rollers and the driving roller may be abutted against two surfaces of the conveyor cloth belt respectively.

Compared with the related art, the medical transfer bed of the present application has the following beneficial effects.

1. The driving roller can be separated from the second driving mechanism by means of the clutch mechanism; the driving roller can be directly taken out from the mounting base by arranging the limiting piece; and the conveyor cloth belt sleeved outside the driving roller and the upper-layer bed board can be taken out as a whole due to detachable connection between the upper-layer bed board and the mounting base, so that the conveyor cloth belt is convenient to replace and clean.
2. Arrangement of the lower-layer bed board provides support to the upper-layer bed board, which improves the stability for mounting the upper-layer bed board and transferring the patient.
3. By means of arrangement of the special-shaped bolt and the T-shaped groove, when the upper-layer bed board is mounted, it is only required to place the special-shaped bolt in the T-shaped groove, then the upper-layer bed board is lapped on the lower-layer bed board, and then limitation and synchronous sliding of the upper-layer bed board and the lower-layer bed board can be achieved, thereby improving the convenience and the rapidness of mounting and disassembling the upper-layer bed board.
4. By matching the positioning bump with the special-shaped bolt, in a case that the upper-layer bed board is mounted on the lower-layer bed board, the special-shaped bolt can limit the positioning bump, making the limiting portions in a use state not be opened, and the driving roller keep to stably rotate in the mounting cavity.
5. By arrangement of the buckling plate rotatably connected to the mounting base, when the driving roller is taken or placed, it is only required to rotate the buckling plate, and then the driving roller can be separated from the mounting base.
6. By means of split arrangement of the shielding portion and the limiting portions, when the upper-layer bed board is in the use state, the driving roller can still be cleaned by opening the shielding portion, which is convenient to operate.
7. Arranging the limiting roller groups improves the stability of rotation of the driving roller, and reduces a force deformation of the driving roller.
8. Arranging the connecting bumps of the first clutch shaft and the second clutch shaft facilitates connection and separation between the driving roller and the second driving mechanism, and improves the convenience and the rapidness of disassembling the driving roller.
9. By arranging the second driving mechanism to be linked with the first driving mechanism, when the upper-layer bed board slides horizontally, it is only required to push the second clutch shaft by the flipping plate to slide, to control rotation of the driving roller, which facilitates control and saves a second driving source.
10. Arranging the third driving mechanism facilitates driving control on the second clutch shaft.

Therefore, the present application has the characteristics of convenience in dissembling and cleaning of the conveyor cloth belt and the like.

Figure 1:
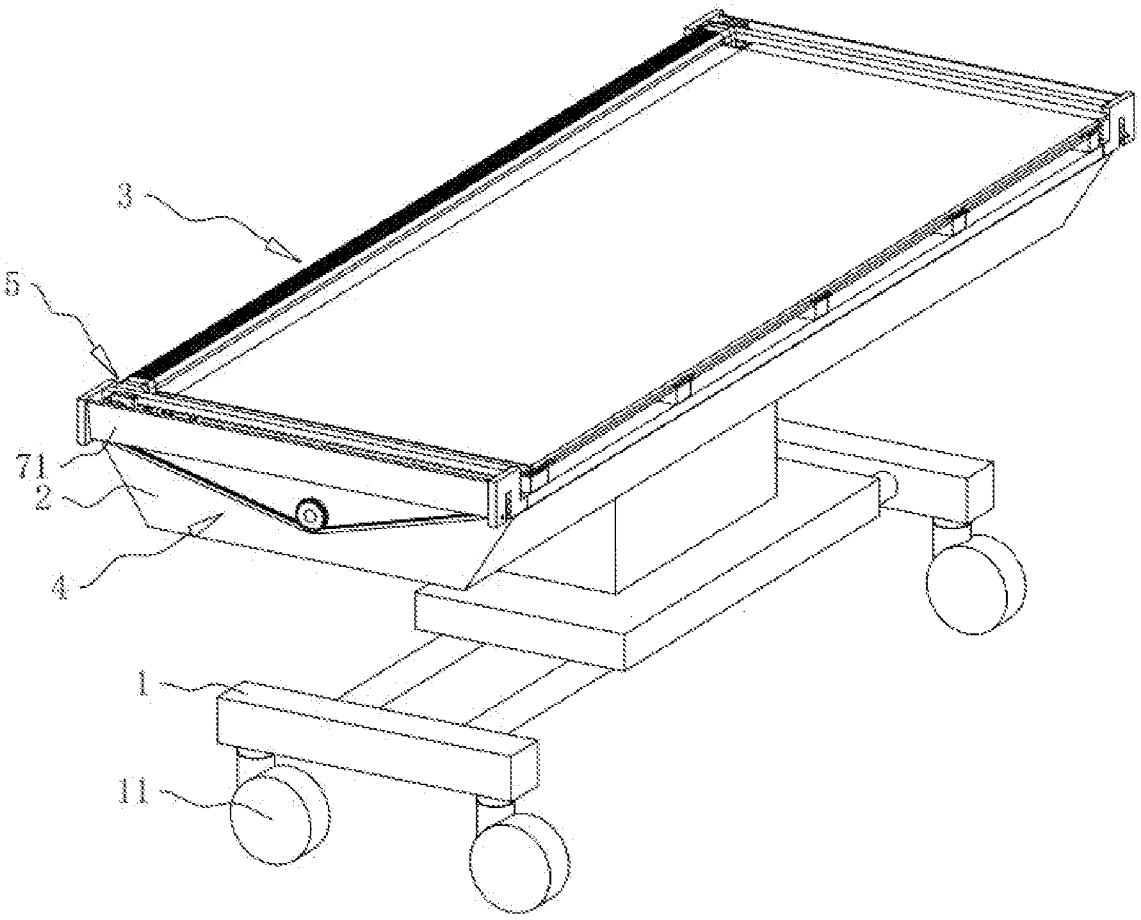
FIG. 1 is a schematic diagram illustrating an overall structure of a medical transfer bed in an original state provided by the present application.

Reference numerals in drawings: 1. movable vehicle frame; 11. rolling wheel; 2. bed base; 21. supporting wheel; 3. movable bed board mechanism; 31. lower-layer bed board; 32. upper-layer bed board; 321. connecting block; 322. special-shaped bolt; 33. driving roller; 34. mounting base; 341. T-shaped groove; 342. mounting groove; 343. buckling plate; 3431. shielding portion; 3432. limiting portion; 3433. positioning bump; 345. limiting roller; 346. chain connecting plate; 35. conveyor cloth belt; 4. first driving mechanism; 41. chain; 42. sprocket; 5. second driving mechanism; 52. rack; 53. gear; 6. clutch mechanism; 61. first clutch shaft; 62. second clutch shaft; 621. reset convex ring; 63. connecting bump; 7. third driving mechanism; 71. flipping plate; 711. rotating shaft; and 72. elastic piece.

DETAILED DESCRIPTION

In order to make the objectives, the features, and the advantages of the present application more apparent and easy to understand, the technical solutions in the embodiments of the present application will be clearly and completely described below with reference to the accompanying drawings in the embodiments of the present application. Apparently, the embodiments described are only some of the embodiments of the present application, not all of them. On the basis of the embodiments in the present application, all other embodiments acquired by those skilled in the art without creative efforts fall within a protection scope of the present application.

EMBODIMENTS

In FIG. 1 to FIG. 5, embodiments of a medical transfer bed provided by the present application are illustrated.

Referring to FIG. 1, a medical transfer bed includes a vehicle body and a movable bed board mechanism 3 mounted on the vehicle body. The vehicle body includes a movable vehicle frame 1 and a bed base 2, on which the movable bed board mechanism 3 is mounted; four rolling wheels 11, through which the vehicle body moves, are mounted at a lower end of the movable vehicle frame 1; and an adjusting mechanism (not shown in the drawing) for vertically adjusting a height of the bed base 2 is arranged in the movable vehicle frame 1. The movable bed board mechanism 3 can transversally move in horizontal and reciprocating modes relative to the bed base 2.

When used, after the vehicle body is moved to a side of an original sickbed of a patient by means of the rolling wheels 11, first, the height of the bed base 2 is adjusted by the adjusting mechanism, to make the movable bed board mechanism 3 slightly higher than an upper surface of the original sickbed; and then, the movable bed board mechanism 3 is horizontally and transversally moved to a position between the patient's body and the original sickbed, to make the patient transferred onto the movable bed board mechanism 3; and finally, the movable bed board mechanism 3 is reset and transversally moved onto the bed base 2, and then, the patient has been transferred.

Figure 2:
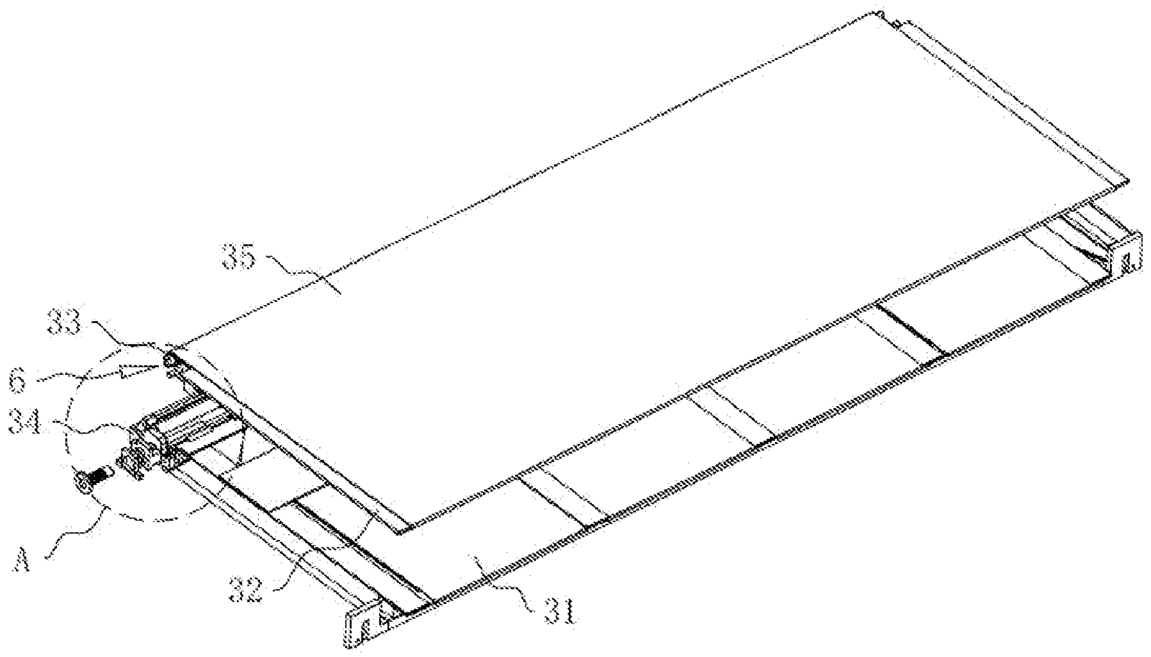
FIG. 2 is a structural exploded view illustrating a movable bed board mechanism of a medical transfer bed provided by the present application.
Figure 3:
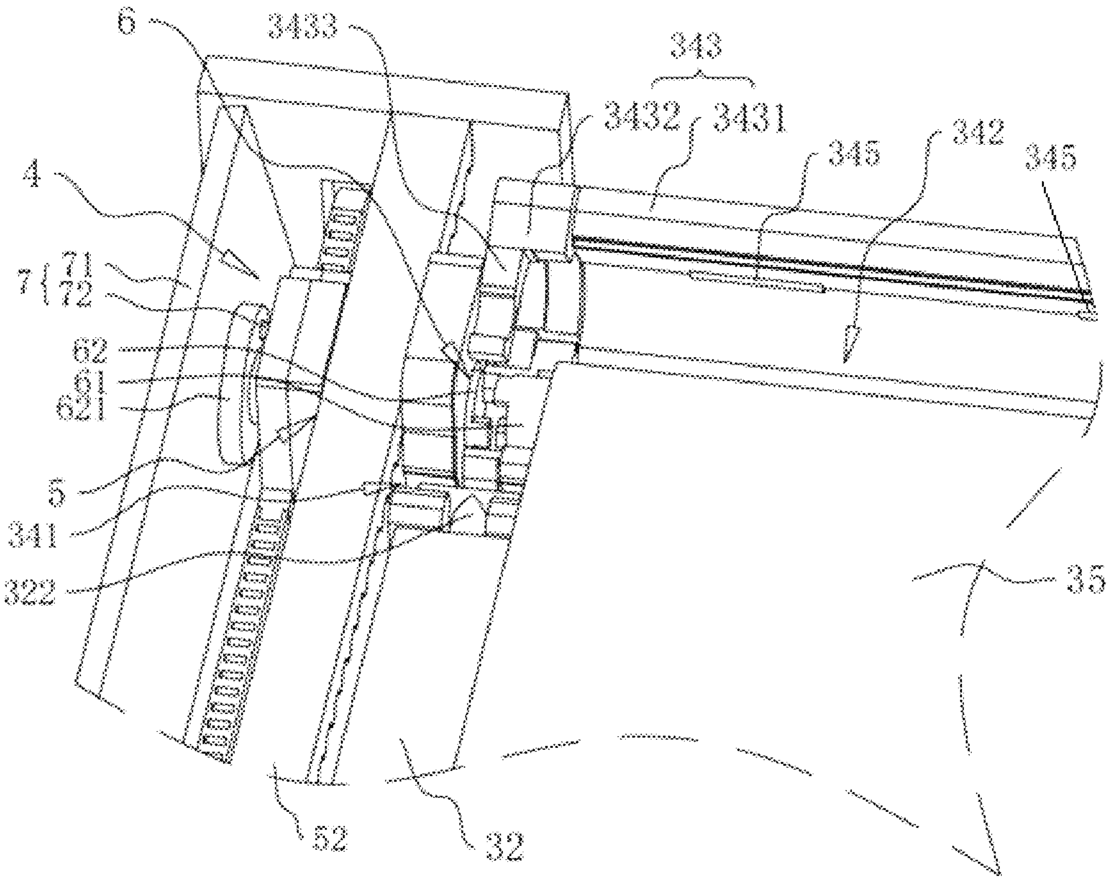
FIG. 3 is a structural diagram illustrating a clutch mechanism of a medical transfer bed provided by the present application.

Referring to FIG. 2 and FIG. 3, the movable bed board mechanism 3 includes a lower-layer bed board 31, an upper-layer bed board 32, a driving roller 33, a mounting base 34, a conveyor cloth belt 35, a first driving mechanism 4 used for driving the upper-layer bed board 32 and the lower-layer bed board 31 to slide horizontally, a second driving mechanism 5 used for driving the driving roller 33 to rotate, and a clutch mechanism 6 used for linking/connecting the driving roller 33 with the second driving mechanism 5. The conveyor cloth belt 35 is sleeved outside the driving roller 33 and the upper-layer bed board 32 and is tensioned by the driving roller 33 and the upper-layer bed board 32.

The driving roller 33 may be a rubber roller with a surface made of rubber, which can strengthen its friction with the conveyor cloth belt 35 and provide stability for conveying. The driving roller 33 may further be made of other materials, which is not limited by the present application.

Figure 4:
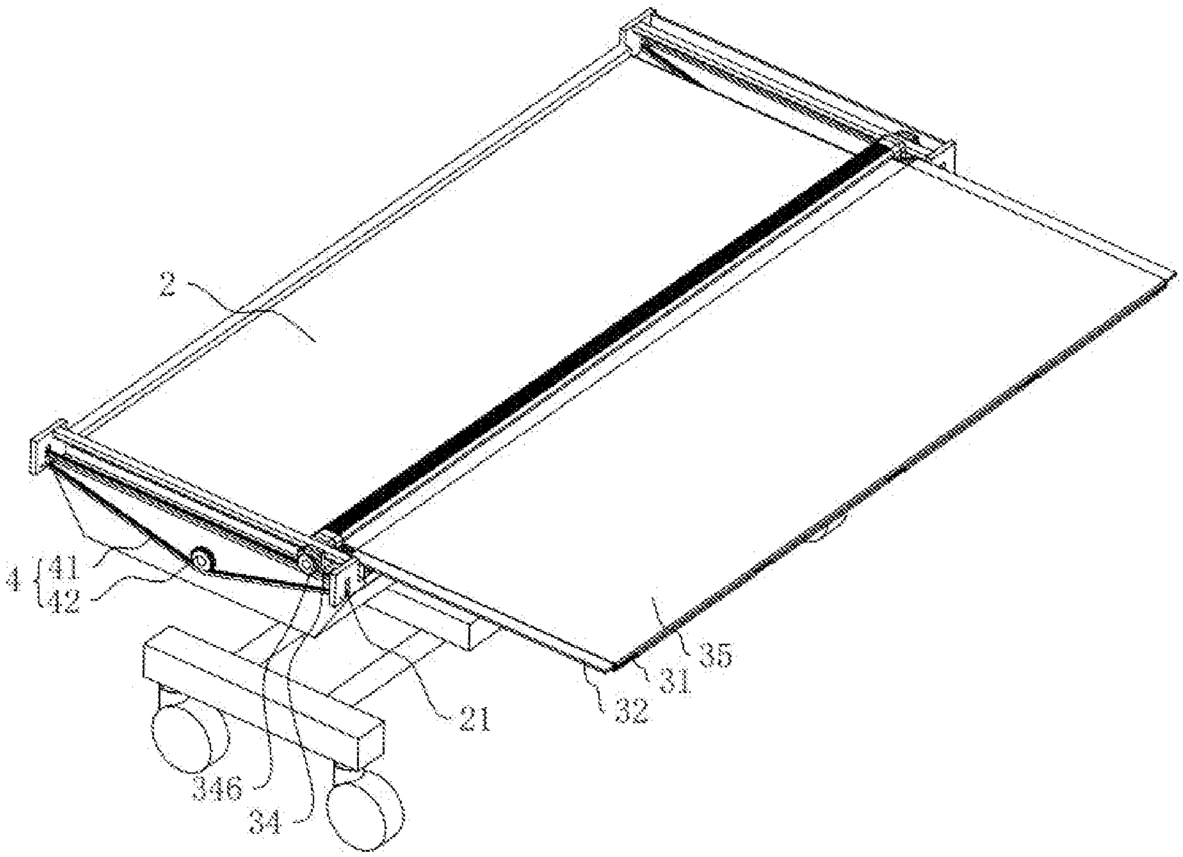
FIG. 4 is a schematic diagram illustrating an overall structure of a movable bed board mechanism in an outward sliding state of a medical transfer bed provided by the present application.

Referring to FIG. 4, the lower-layer bed board 31 is placed on an upper end surface of the bed base 2. The mounting base 34 is fixedly connected to a side, far away from a moving-out direction, of the lower-layer bed board 31; and the moving-out direction is a moving direction of the movable bed board mechanism 3 toward the original sickbed.

Referring to FIG. 4, a group of the driving mechanism 4 is disposed at each of two ends of the mounting base 34. The driving mechanism 4 includes a chain 41, a sprocket 42 engaged with the chain 41, and a motor (not shown in the drawing) driving the sprocket 42 to rotate. The motor is mounted in the movable vehicle frame 1. A chain connecting plate 346 is fixedly arranged on the mounting base 34; and two ends of the chain 41 are fixedly connected to two ends, in a sliding direction, of the chain connecting plate 346 respectively. A supporting wheel 21 is rotatably connected to each of the two ends, in a sliding direction of the mounting base 34, of the bed base 2, so that a portion, disposed at the mounting base 34, of the chain 41 is horizontally arranged. In a case that the motor drives the sprocket 42 to rotate, the chain 41 runs, so as to drive the mounting base 34 and the lower-layer bed board 31 to slide horizontally.

Figure 5:
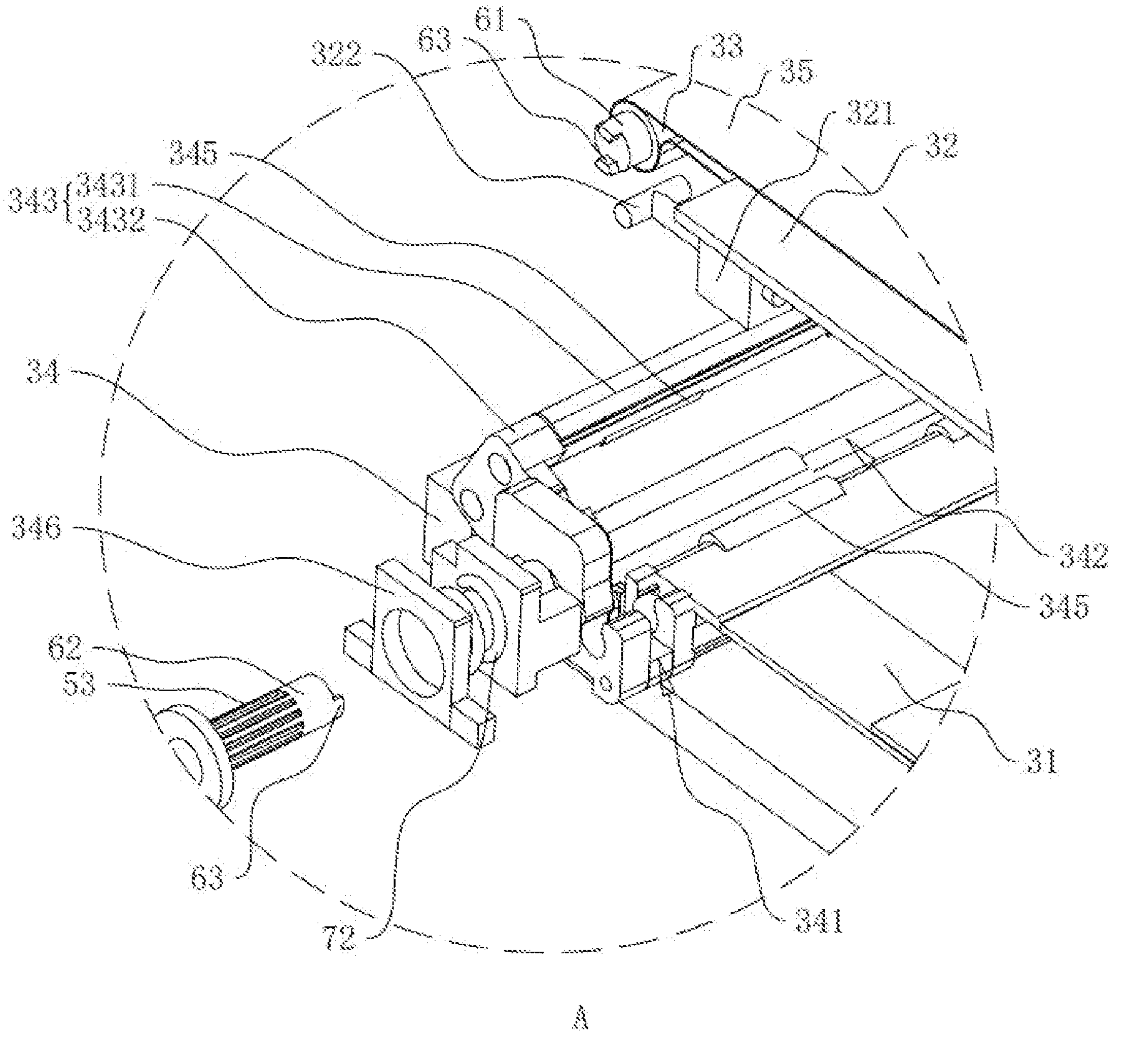
FIG. 5 is a partial enlarged view of part Ain FIG. 2.

Referring to FIG. 2 and FIG. 5, the upper-layer bed board 32 is lapped on the lower-layer bed board 31, and disposed on a side of the mounting base 34; and the upper-layer bed board 32 and the lower-layer bed board 31 are horizontally limited by means of a synchronization piece, and keep a synchronous slide in a horizontal direction.

T-shaped grooves 341 with a T-shaped horizontal section are formed in two ends of the mounting base 34 respectively. A connecting block 321 is fixedly arranged at a bottom, facing an end of the mounting base 34, of the upper-layer bed board 32; the synchronization piece is a special-shaped bolt 322 with the T-shaped horizontal section, which horizontally penetrates through and is in threaded connection to the connecting block 321, so that connection is convenient; and a spacing between the driving roller 33 and the upper-layer bed board 32 is adjusted by means of threaded connection between the special-shaped bolt 322 and the connecting block 321, so as to adjust a tension degree of the conveyor cloth belt 35.

In a case that the upper-layer bed board 32 is lapped on the lower-layer bed board 31, the special-shaped bolt 322 is disposed in the T-shaped groove 341, so that the upper-layer bed board 32 is horizontally limited and keeps synchronous slide relative to the lower-layer bed board 31.

The upper-layer bed board 32 is lifted upward with keeping a horizontal state when being disassembled until the special-shaped bolts 322 are departed from the T-shaped grooves 341, so that the conveyor cloth belt 35 is conveniently taken out from the upper-layer bed board 32.

Referring to FIG. 5, a mounting groove 342 with a semicircular section is formed in the mounting base 34; and the driving roller 33 is placed in the mounting groove 342, and can rotate along its own axis in the mounting groove 342.

Referring to FIG. 3 and FIG. 5, a limiting piece used for limiting the driving roller 33 in a radial direction is arranged on the mounting base 34. In this embodiment, the limiting piece is arranged as a buckling plate/pinch plate 343 which is rotatably connected to the mounting base 34 and disposed above the mounting groove 342.

The buckling plate 343 includes a shielding portion 3431 and two limiting portions 3432, where the shielding portion 3431 and two limiting portions 3432 are split from each other and can independently rotate; and when the buckling plate 343 rotates to cover the driving roller 33, the buckling plate 343 is matched with the mounting groove 342 to form a mounting cavity. The two limiting portions 3432 are respectively disposed at two ends of the driving roller 33 and cover end parts of the driving roller 33, to be used for limiting the driving roller 33 in the mounting groove 342. When there is a need for taking out the driving roller 33, it is only required to rotate the limiting portions 3432 relative to the mounting base 34, so as to open the mounting groove 342, and thus operation is convenient. The shielding portion 3431 covers a middle part of the driving roller 33, capable of preventing dust and other foreign matters from entering the mounting groove 342 to affect rotation of the driving roller 33. The shielding portion 3431 can be opened independently, which is convenient to clean the driving roller 33.

Referring to FIG. 5, an inner wall of the mounting cavity is rotatably connected to at least three limiting roller groups. A plurality of limiting roller groups are arranged in a circumferential direction of the driving roller 33 at an equal interval to form three-point limitation for the driving roller 33, so that the driving roller 33 keeps stably rotate in the mounting cavity. In this embodiment, there are four limiting roller groups that are disposed on upper and lower sides and left and right sides, in a horizontal direction, of the driving roller 33 respectively; and the limiting roller group on the lower side of the driving roller 33 can support the driving roller 33 at the same time, so as to prevent the driving roller 33 from deforming. Each limiting roller group includes a plurality of limiting rollers 345 arranged in an axial direction of the driving roller 33. When the conveyor cloth belt 35 is sleeved outside the driving roller 33, the conveyor cloth belt 35 passes between the driving roller 33 and the limiting rollers 345; and thus, the limiting rollers 345 further strengthen the friction between the conveyor cloth belt 35 and the driving roller 33.

Referring to FIG. 3, an embedding groove is formed in a bottom of the T-shaped groove 341; and a positioning bump 3433 is integrally connected to a side, facing the T-shaped groove 341, of the limiting portion 3432, and disposed in the embedding groove. In a case that the upper-layer bed board 32 is lapped on the lower-layer bed board 31 and is horizontally limited with the lower-layer bed board 31, the special-shaped bolts 322 are disposed in the T-shaped grooves 341, and abutted against upper end surfaces of the positioning bumps 3433, making the limiting portions 3432 not be rotated and opened, so that the driving roller 33 is stably positioned in the mounting groove 342 by means of the limiting portions 3432.

When there is a need for replacing the conveyor cloth belt 35, the buckling plate 343 is opened, and by releasing the connection with the second driving mechanism 5 by means of the clutch mechanism 6, the driving roller 33 can be taken out from the mounting groove 342. Therefore, the conveyor cloth belt 35 is convenient to replace.

Referring to FIG. 3 and FIG. 5, the clutch mechanism 6 includes a first clutch shaft 61 integrally formed at the end part of the driving roller 33 and a second clutch shaft 62 that penetrates through the mounting base 34 in its own axial direction and is slidably connected to the mounting base 34; the first clutch shaft 61 is coaxial with the second clutch shaft 62; and connecting bumps 63 are respectively arranged at an end of the first clutch shaft 61 and an end of the second clutch shaft 62 opposite to the end of the first clutch shaft 61.

A third driving mechanism 7 used for driving the second clutch shaft 62 to slide is arranged on the vehicle body. In a case that the first clutch shaft 61 and the second clutch shaft 62 synchronously rotate, the third driving mechanism 7 pushes the first clutch shaft 61 to slide toward the second clutch shaft 62, making the connecting bump 63 of the first clutch shaft 61 mutually clamped and circumferentially limited with the connecting bump 63 of the second clutch shaft 62, so that transmission is achieved. When there is no need for rotating the driving roller 33, the third driving mechanism 7 drives the first clutch shaft 61 to slide away from the second clutch shaft 62, making the connecting bump 63 of the first clutch shaft 61 be departed from the connecting bump 63 of the second clutch shaft 62, and making the first clutch shaft 61 separated from the second clutch shaft 62, so that the driving roller 33 is conveniently taken out from the mounting groove 342.

Referring to FIG. 3 and FIG. 5, the second driving mechanism 5 includes a rack 52 arranged above the second clutch shaft 62 and extending in a sliding direction of the mounting base 34, and a gear 53 arranged in a circumferential direction of the second clutch shaft 62. Two ends of the rack 52 are fixedly connected to the bed base 2. A width of the gear 53 on the second clutch shaft 62 is set no smaller than a total length of a width of the rack 52 plus a sliding distance of the second clutch shaft 62. Therefore, in a case that the second clutch shaft 62 slides on the mounting base 34, the second clutch shaft 62 can always keep engagement with the rack 52 by means of the gear 53. In a case that the first driving mechanism 4 drives the mounting base 34 and the second clutch shaft 62 to slide horizontally, the second clutch shaft 62 always keeps rotation by matching the gear 53 with the rack 52.

Referring to FIG. 3, the third driving mechanism 7 includes a flipping plate 71 rotatably connected to the vehicle body, a driving piece (not shown in the drawing) driving the flipping plate 71 to rotate, and an elastic piece 72 used for driving the second clutch shaft 62 to move far away from the first clutch shaft 61.

An end of the second clutch shaft 62 penetrates through and is exposed to the mounting base 34; and a reset convex ring 621 is integrally formed at an end part of the second clutch shaft 62. The elastic piece 72 is fixedly connected to the mounting base 34, and may be a spring or an elastic layer made of rubber and other elastic materials. In this embodiment, using the spring for illustration, an end of the spring is abutted against the reset convex ring 621; and in a case that the first clutch shaft 61 is engaged with the second clutch shaft 62, the spring is in a stressed and compressed state.

The flipping plate 71 is rotatably connected to the bed base 2 by means of a rotating shaft 711; and the rotating shaft 711 is disposed on a side, far away from the second clutch shaft 62, of the flipping plate 71. The flipping plate 71 extends in the sliding direction of the mounting base 34, and covers an entire sliding position of the mounting base 34. Therefore, wherever the mounting base 34 slides to, the flipping plate 71 can rotate and push the second clutch shaft 62 to slide toward and be engaged with the first clutch shaft 61.

The driving piece driving the flipping plate 71 to rotate, as the related art, may be achieved by means of a driving cylinder or a crank-slider structure, and the details are not redundantly repeated herein any more.

The adjusting mechanism, as the related art, is used for adjusting a distance between the bed base 2 and the movable vehicle frame 1, and can be driven by a screw-slider structure, an oil cylinder or other structures, so as to lift the bed base 2. Therefore, the bed base 2 and the movable bed board mechanism 3 can adapt to original sickbeds with different heights, and a transfer action is completed, which will not be detailed here by the present application.

The specific implementation principle of the embodiment (s) is as follows.

When used, the bed base 2 is moved to a side of an original sickbed by means of the movable vehicle frame 1, and is adjusted to a suitable height by means of the adjusting mechanism, so that a lower surface of the lower-layer bed board 31 keeps flush with an upper surface of the original sickbed.

Then, the motor drives the sprocket 42 to drive the chain 41 to run, and the mounting base 34 is pulled to slide horizontally; the mounting base 34 drives the lower-layer bed board 31 to slide horizontally outward; and the upper-layer bed board 32 achieves synchronous movement by matching the special-shaped bolts 322 with the T-shaped grooves 341 of the mounting base 34, so that the upper-layer bed board 32 and the lower-layer bed board 31 are both moved between the patient's body and the upper surface of the original bed. In the process that the upper-layer bed board 32 is moved between the patient's body and the upper surface of the original bed, the second clutch shaft 62 continuously rotates toward the mounting base 34 along its own axis by matching the gear 53 with the rack 52; at this time, the second clutch shaft 62 is pushed to be engaged with the first clutch shaft 61 by means of rotation of the flipping plate 71; the first clutch shaft 61 drives the driving roller 33 to rotate; and the driving roller 33 pulls the conveyor cloth belt 35 in a direction opposite to movement of the upper-layer bed board 32, so that the patient's body is more easily moved onto the upper-layer bed board 32 by means of friction between the conveyor cloth belt 35 and the patient's body. In a case that the patient's body is completely placed on the upper-layer bed board 32, the upper-layer bed board 32 and the lower-layer bed board 31 are driven by the first driving mechanism 4 to reset and be moved transversally onto the bed base 2, during which, force applied by the flipping plate 71 to the second clutch shaft 62 is released; and the second clutch shaft 62 is separated from the first clutch shaft 61 by means of elastic force of the elastic piece 72. At this time, when the upper-layer bed board 32 is moved, the driving roller 33 and the conveyor cloth belt 35 keep stationary, so that the patient can be stably on the upper-layer bed board 32, and has been transferred.

When the conveyor cloth belt 35 is disassembled for replacing or cleaning, first, the upper-layer bed board 32 is lifted up, making the special-shaped bolts 322 released from the T-shaped grooves 341; and then, the buckling plate 343 is opened. In a case that the flipping plate 71 does not apply the force, the first clutch shaft 61 and the second clutch shaft 62 always keep in a separating state by means of the elastic piece 72; and the driving roller 33 can be directly taken out from the mounting groove 342, so that the conveyor cloth belt 35 sleeved outside the driving roller 33 and the upper-layer bed board 32 can be directly taken out, so as to be convenient to replace and clean.

In the description of this specification, descriptions of reference terms such as "an embodiment", "some embodiments", "examples", "specific examples" or "some examples" mean that the specific features, structures, materials or characteristics described in combination with the embodiments or the examples are included in at least one embodiment or example of the present application. Moreover, the specific features, structures, materials or characteristics can be combined in any suitable manner in an or more embodiments or examples. In addition, various embodiments or examples described in the specification, as well as features of various embodiments or examples, can be combined and combined by those skilled in the art without contradicting each other.

In addition, the terms "first" and "second" are only used for description and cannot be construed as indicating or implying relative importance or implicitly specifying the number of indicated technical features. Thus, the features defined with "first" and "second" may include at least one such feature, either explicitly or implicitly. In the description of the present application, "a plurality of" means two or more, unless expressly specified otherwise.

What is described above is merely specific embodiments of the present application, but a protection scope of the present application is not limited thereto. Any change or substitution that can be easily conceived by any technician familiar with the technical field within the technical scope disclosed by the present application should be covered within the protection scope of the present application. Therefore, the scope of protection of the present application shall be subject to the protection scope of the above claims.

What is claimed is:

1. A medical transfer bed, comprising a vehicle body and a movable bed board mechanism (3) mounted on the vehicle body, wherein the movable bed board mechanism (3) comprises an upper-layer bed board (32), a driving roller (33), a conveyor cloth belt (35) and a mounting base (34); the upper-layer bed board (32) is detachably connected to the mounting base (34), and the driving roller (33) is rotatably connected to the mounting base (34); the conveyor cloth belt (35) is sleeved outside the driving roller (33) and the upper-layer bed board (32) and is tensioned by the driving roller (33) and the upper-layer bed board (32); wherein two ends of the driving roller (33) are detachably connected to a second driving mechanism (5) by means of a clutch mechanism (6) and are driven by the second driving mechanism (5) to rotate; a limiting piece used for limiting the driving roller (33) in a radial direction is arranged on the mounting base (34); and when the limiting piece and the driving roller (33) are misaligned, the driving roller (33) is capable of being arranged separately from the mounting base (34);

wherein the clutch mechanism (6) comprises a first clutch shaft (61) connected to an end part of the driving roller (33), and a second clutch shaft (62) that penetrates through the mounting base (34) in an own axial direction and is slidably connected to the mounting base (34); wherein a third driving mechanism (7) used for driving the second clutch shaft (62) to slide is arranged on the vehicle body; the first clutch shaft (61) is coaxial with the second clutch shaft (62); connecting bumps (63) are respectively arranged at an end of the first clutch shaft (61) and an end of the second clutch shaft (62) opposite to the end of the first clutch shaft (61); and when the first clutch shaft (61) and the second clutch shaft (62) rotate synchronously, the connecting bump (63) of the first clutch shaft (61) is abutted against a side of the connecting bump (63) of the second clutch shaft (62), and the second driving mechanism (5) drives the second clutch shaft (62) to rotate.

2. The medical transfer bed of claim 1, wherein the movable bed board mechanism (3) further comprises a lower-layer bed board (31); a side of the lower-layer bed board (31) is connected to the mounting base (34) and supports a lower end of the upper-layer bed board (32); and the upper-layer bed board (32) is horizontally limited with the lower-layer bed board (31) together by means of a synchronization piece.

3. The medical transfer bed of claim 2, wherein the synchronization piece is a special-shaped bolt (322) with a T-shaped section; the special-shaped bolt (322) is connected to the upper-layer bed board (32); a T-shaped groove (341) is formed in the mounting base (34); and the special-shaped bolt (322) is disposed in the T-shaped groove (341) and horizontally limited by the T-shaped groove (341).

4. The medical transfer bed of claim 3, wherein an embedding groove is formed in a bottom of the T-shaped groove (341); a positioning bump (3433) is arranged on the limiting piece and disposed in the embedding groove; and the special-shaped bolt (322) is abutted against an upper end of the positioning bump (3433) when being disposed in the embedding groove.

5. The medical transfer bed of claim 1, wherein the limiting piece is a buckling plate (343); and the buckling plate (343) is rotatably connected to the mounting base (34), covers the driving roller (33) and is matched with a mounting groove (342) to form a mounting cavity.

6. The medical transfer bed of claim 5, wherein the buckling plate (343) comprises a shielding portion (3431) and limiting portions (3432) that are split from each other; each of the limiting portions (3432) is arranged at each of the two ends of the driving roller (33); and the shielding portion (3431) is disposed between the two limiting portions (3432).

7. The medical transfer bed of claim 5, wherein the mounting groove (342) is formed in the mounting base (34);

the driving roller (33) is placed in and rotatably connected to the mounting groove (342); an inner wall of the mounting cavity is rotatably connected to at least three limiting roller groups; the limiting roller groups are arranged in a circumferential direction of the driving roller (33), and each of the limiting roller groups comprises a plurality of limiting rollers (345) arranged in an axial direction of the driving roller (33); and the limiting rollers (345) and the driving roller (33) are abutted against two surfaces of the conveyor cloth belt (35) respectively.

8. The medical transfer bed of claim 1, wherein the second driving mechanism (5) comprises a rack (52) arranged above the second clutch shaft (62) and extending in a sliding direction of the mounting base (34), and a gear (53) arranged in a circumferential direction of the second clutch shaft (62); the rack (52) is connected to the vehicle body; and when the second clutch shaft (62) slides on the mounting base (34), the second clutch shaft (62) always keeps engagement with the rack (52) by means of the gear (53).

9. The medical transfer bed of claim 1, wherein the third driving mechanism (7) comprises a flipping plate (71) rotatably connected to the vehicle body, a driving piece driving the flipping plate (71) to rotate, and an elastic piece (72) used for driving the second clutch shaft (62) to move far away from the first clutch shaft (61); wherein the flipping plate (71) extends in a sliding direction of the mounting base (34); an end of the second clutch shaft (62) is exposed to the mounting base (34); and the elastic piece (72) is disposed between the second clutch shaft (62) and the mounting base (34).

* * * * *